United States Patent [19]

Ehrens et al.

[11] 4,143,843

[45] Mar. 13, 1979

[54] ALIGNING KIT

[75] Inventors: Henry Ehrens, Bayside, N.Y.; Charles W. Slocum, Spring Lake Heights, N.J.; Anthony Mancuso, Brick Township, Bergen County, N.J.; Sidney Weiner, Cresskill, N.J.

[73] Assignee: Sealed Unit Parts Co., Inc., Allenwood, N.J.

[21] Appl. No.: 772,427

[22] Filed: Feb. 28, 1977

[51] Int. Cl.$^2$ ............................................. F16M 13/00
[52] U.S. Cl. ........................................... 248/544; 248/1
[58] Field of Search ................... 29/407; 248/16, 23, 248/346; 33/174 G, 180 R, 181 R; 206/577

[56] References Cited

U.S. PATENT DOCUMENTS

| | | | |
|---|---|---|---|
| 661,539 | 11/1900 | Krauss | 33/174 G |
| 878,043 | 2/1908 | Chrisman | 248/33 X |
| 1,857,951 | 5/1932 | Gadd | 33/174 G |
| 2,799,093 | 7/1957 | Miller | 33/180 R |
| 2,940,297 | 6/1960 | Mayer | 248/23 X |
| 3,015,164 | 1/1962 | Antell | 33/174 G X |
| 3,248,077 | 4/1966 | Charles | 248/23 |

FOREIGN PATENT DOCUMENTS

| | | | |
|---|---|---|---|
| 169478 | 9/1921 | United Kingdom | 33/181 |
| 672744 | 5/1952 | United Kingdom | 33/174 G |
| 691284 | 5/1953 | United Kingdom | 248/23 |

*Primary Examiner*—William H. Schultz
*Attorney, Agent, or Firm*—Roger A. Clapp

[57] ABSTRACT

An assembly is disclosed which comprises brackets and a template for facilitating the mounting of a replacement article such as a compressor or the like on an existing base. The brackets are adapted for adjustable mounting on the base and the template has arms joined in adjustable relationship by a central pivot clamp so that the brackets and template can cooperate to establish an index which will align mounting elements in the base in coincident relationship with corresponding mounting elements on the replacement article.

9 Claims, 6 Drawing Figures

ALIGNING KIT

BACKGROUND OF THE INVENTION

1. Field of the Invention

This invention relates to mounting arrangements and pertains in particular to assemblies adapted to facilitate mounting of a replacement article on an existing support base.

2. Description of the Prior Art

Operating equipment, such as motors, compressors and the like have a finite life and sooner or later must be replaced. Such equipment ordinarily is mounted as a replaceable part of a larger assembly. When a part becomes defective and is removed, however, the mounting elements, i.e., bolt holes, mounting studs or the like, do not usually correspond with counterparts in the larger assembly. Consequently, an installer is forced to improvise on the job location thereby causing him to lose time and efficiency.

Accordingly, it is broadly the object of this invention to improve replacement efficiency when mounting an article in substitution for another.

Where a service man must improvise compatibility on the spot, he often finds it difficult to correlate the mounting elements while simultaneously correlating the operative interconnections between the replacement item and other elements in the assembly.

Accordingly, another object of this invention is to facilitate correlation between mounting elements while simultaneously achieving coincidence between fittings, interconnections, etc. in the overall assembly so as to further improve installation efficiency.

SUMMARY OF THE INVENTION

In accordance with the preferred embodiment of this invention, a template having a plurality of arms pivotally joined by a clamp references a set of brackets between existing mounting elements in the base and replacement unit so as to facilitate installation.

A better understanding of these and other objects of this invention will be furthered by reference to the following drawing and detailed description.

DETAILED DESCRIPTION OF THE INVENTION

Figure 4:
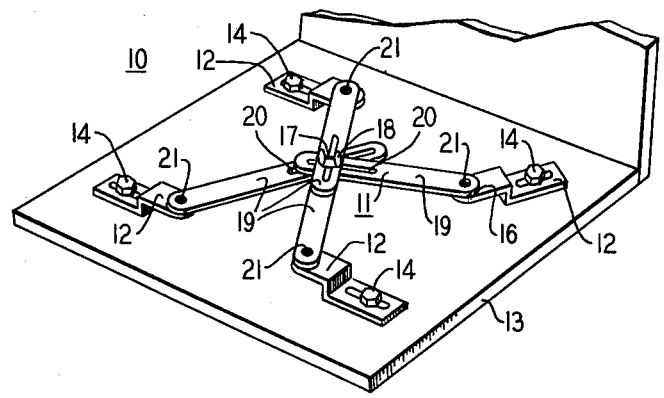
FIG. 4 is a perspective view of the base shown in FIG. 1 illustrating the template and brackets cooperating in accordance with this invention.

Referring to FIG. 4, an assembly for facilitating the mounting of a replacement article on an existing base 10 is shown comprising a template assembly 11 and a plurality of brackets 12.

Figure 1:
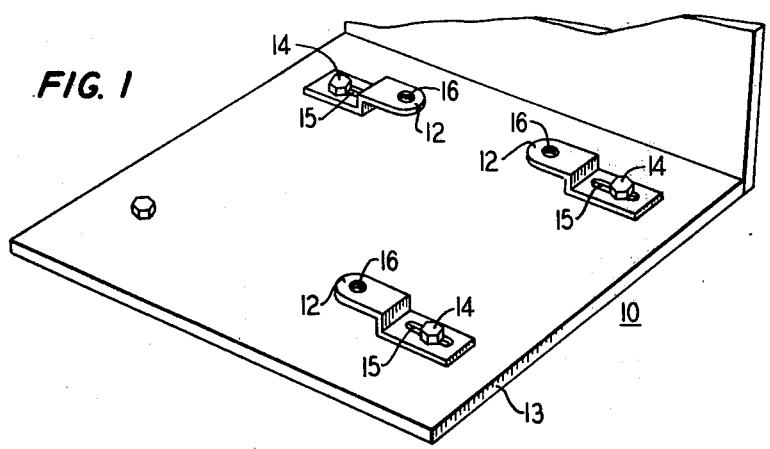
FIG. 1 is a perspective view of a portion of a support base from which an article such as a compressor has been removed and upon which several brackets have been partially installed in accordance with this invention.

The base 10 comprises a platform 13 which has support mounting elements 14 such as bolts used to hold in place an article such as an air conditioner compressor (now shown). As shown in FIG. 1, the article or compressor has been removed and three brackets 12 have been partially installed on the base 10. Each bracket 12 is advantageously made of a stiff and rigid material such as steel. Moreover, each bracket 12 is bent to take a generally ramped shape wherein one end has a support mounting element 15; i.e., a slot adapted to accommodate a bolt 14, and the other end includes an article mounting element 16 for accepting a replacement article. The element 16 may be a bolt, other fastening means or, as illustrated, a threaded bolt hole. The brackets 12 are free to shift about on the bolts 14 and are adapted to become fixed when the bolts 14 are tightened in place. Positioning of the brackets 12 is determined by an indexing established in the template 11.

Figure 2:
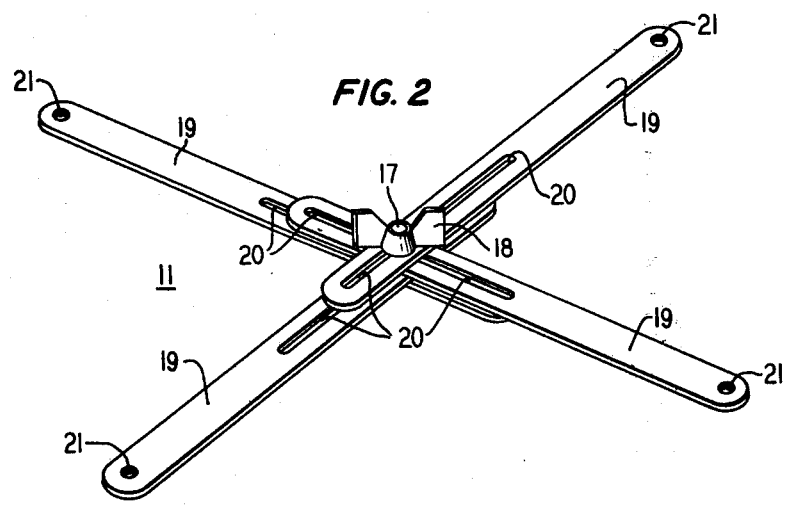
FIG. 2 is a perspective view of a template made in accordance with this invention.

As best seen in FIG. 2, the template assembly 11 comprises a pivot pin 17, lock nut 18 and four overlapping arms 19. The arms 19 are advantageously made of a rigid material such as steel. Each arm 19 includes a slot 20 defined by parallel interior surfaces and an index such as the hole 21. The slots 20 are wide enough to slidably accommodate the pivot pin 17 and the arms 19 are adapted to remain rigidly in place when the lock nut 18 is tightened on the pivot pin 17.

Figure 3:
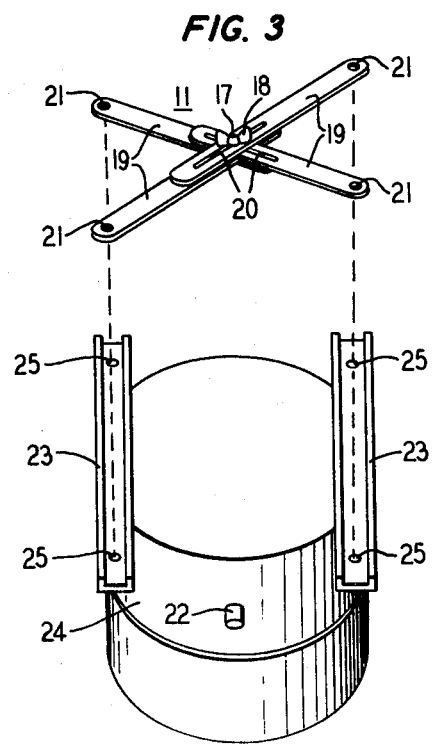
FIG. 3 is a perspective view of the template shown in FIG. 2 located in proximity to an inverted replacement compressor being readied for mounting on the base shown in FIG. 1.

The template assembly 11 indexes the spacial relationship of the elements 16 to the spacial position of corresponding article mounting elements on a replacement article. Referring to FIG. 3, a replacement article such as a compressor 24 is illustrated in an inverted position. The compressor 24 includes a fitting 22 and two mounting rails 23 wherein each rail includes two article mounting elements 25 such as the holes illustrated. In order to achieve indexing, the template assembly 11 is brought into proximity with the elements 25 on the compressor 24 as illustrated in FIG. 3.

Figure 5:
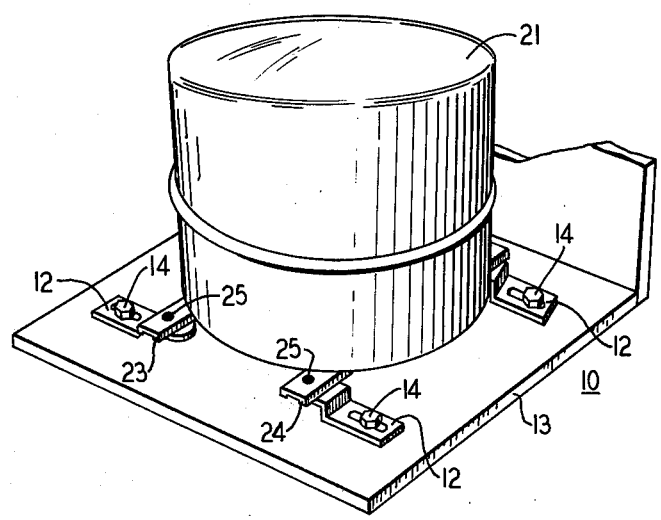
FIG. 5 is a perspective view of the base shown in FIG. 1 illustrating the mounting of the compressor shown in FIG. 3 on the base shown in FIG. 1.
Figure 6:
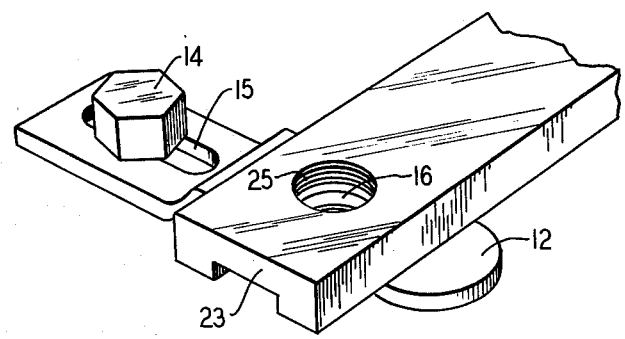
FIG. 6 is an enlarged perspective view of a bracket and a portion of the mounting structure on the compressor shown in FIG. 3 cooperating in accordance with this invention.

With the template assembly 11 in place as shown in FIG. 3, the arms 19 are adjusted about the pivot pin 17 until the holes 21 ae coincident with the elements 25. Thereafter, the nut 18 is tightened until the arms 19 ae held fixedly in place so that the spacial relationship of the elements 25 will be reproduced by the holes 21. Next, the template assembly 11 is brought into proximity to the brackets 12 as shown in FIG. 4. Thereafter, the brackets 12 are adjusted on the bolts 14 until the holes 16 are coincident with the holes 21 in the template assembly 11. The bolts 14 are then tightened to hold the brackets 12 rigidly in place so that the compressor 24, as shown in FIGS. 5 and 6, can be placed on the brackets 12 and bolted in place. It will be noted that by the foregoing procedure, the replacement compressor 24 is readily mounted in substantially the same physical location as the original unit thereby improving alignment between connections such as the pipe 22, etc.

In summary, an assembly has been disclosed which facilitates installation of replacement articles such as compressors and the like in a way which increases installation efficiency while simultaneously facilitating the alignment between existing interconnections. While only one embodiment has been disclosed, it is illustrative of the principals of this invention and many other embodiments failing within the scope of the invention will readily occur to those skilled in the art.

What we claim is:

1. In an assembly adapted to facilitate the joining of a plurality of first article mounting means located on a replacement unit to a corresponding plurality of first support mounting means located on a base, the combination comprising:

a plurality of individual brackets for interfacing between said first article mounting means and said first support mounting means wherein each bracket is an elongated flat strip having a substantially "Z" shaped configuration and includes a second article mounting means on one end for engaging a first article mounting means and a second support mounting means on the other end for engaging a first support mounting means;

a template comprising a pivot pin, a plurality of elongated arms wherein each arm includes locating means for adjustably positioning said arm on said pivot pin so that said pivot pin extends through the locating means in each of said arms, and indexing means for recording the spacial relationship of all of said first article mounting means with respect to each other when said arms are moved to selected positions on said pivot pin and rigidly held in place; and enabling means for locking together said first and second support mounting means when said second article mounting means are aligned in coincidence with said indexing means whereby each first article mounting means on said replacement article will be in identical spacial relationship with a corresponding second article mounting means fastened to said base.

2. The combination in accordance with claim 1 wherein said locating means comprises two interior sides in said arm spaced from each other in parallel relationship to provide a slot in which said sides generally bear against said pivot pin.

3. The combination in accordance with claim 2 wherein said enabling means comprises a plurality of bolts in said base.

4. The combination in accordance with claim 3 wherein said indexing means comprises a hole at the end of each arm.

5. Th combination in accordance with claim 1 wherein said first and second article mounting means comprise a bolt and corresponding holding threads and said first and second support means comprise a slot and locking bolt.

6. The combination in accordance with claim 1 wherein said second article mounting means includes an aperture for accommodating a bolt and said second support means includes a slot for slidably accommodation a bolt.

7. The combination in accordance with claim 6 wherein said aperture is a tapped hole.

8. The combination in accordance with claim 1 wherein each bracket is made of sheet metal and has a hole in one end and a slot in the other end.

9. The combination in accordance with claim 8 wherein said hole is tapped.

* * * * *